Aug. 14, 1928.
G. A. McDONALD
1,680,560
ADJUSTABLE BRACKET
Filed July 15, 1926
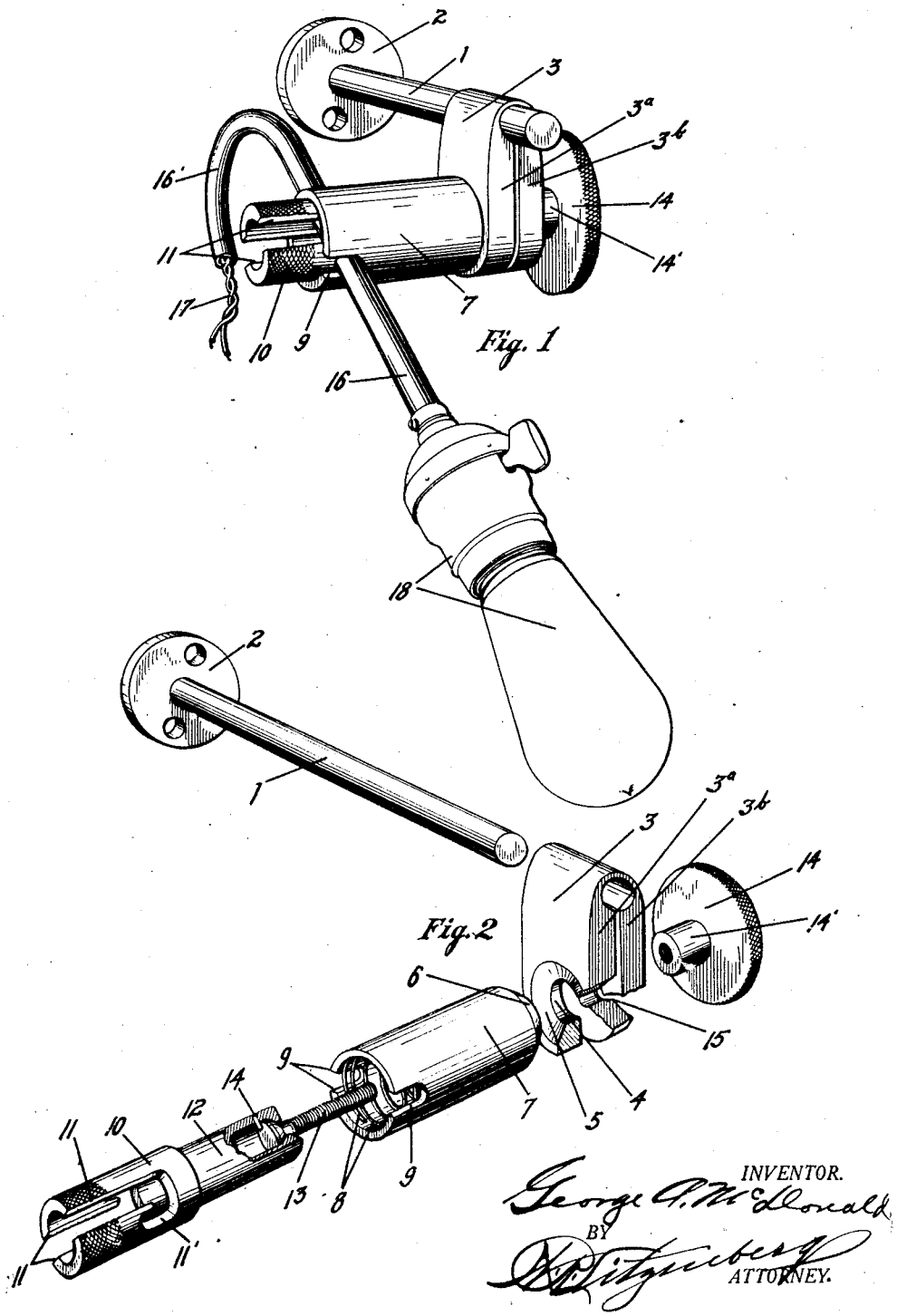

Patented Aug. 14, 1928.

1,680,560

UNITED STATES PATENT OFFICE.

GEORGE A. McDONALD, OF PASADENA, CALIFORNIA.

ADJUSTABLE BRACKET.

Application filed July 15, 1926. Serial No. 122,569.

My invention relates to adjustable brackets and while it is designed for the purpose of adjustably holding an electric lamp, it is evident that it has other uses, and also, while it is especially designed for use on a linotype machine, it will be evident that it can be used in other places than on a linotype machine.

Among the salient objects of my invention are: to provide a durable and universally adjustable bracket for adjustably holding an electric lamp or the like in various positions; to provide adjustable joints which are capable of being securely locked in adjusted positions; to provide a bracket in which a supporting member of tubular form, having an electric cord therethrough, can be readily detached from the bracket by a lateral movement, thus making it possible to detach the lamp and its cord from the bracket without the necessity of pulling a cord through a pipe or hole; and, in general, to provide an accurately adjustable bracket with joints which can be adjusted quickly and securely locked in various positions.

In order to fully explain my invention, I have illustrated one practical embodiment thereof on the accompanying sheet of drawings, which I will now describe.

In the drawings, Fig. 1 is a perspective view of an adjustable bracket embodying my invention; and Fig. 2 is a similar view with the parts pulled apart to show the construction and arrangement thereof, the lamp and holder being omitted from this view.

Referring now in detail to the drawings, 1, designates a supporting member or rod, having the base, 2, adapted to be secured to a linotype or other support in connection with which it is desired to have an electric light adjustably held for use. A clamp element, 3, is fitted around said rod, or member, 1, and is adapted to have its two body portions, 3ª and 3ᵇ, closed together, whereby it is clamped on the rod, 1, in any desired position along said member, 1, and also in any desired position around said member 1, as will be understood. The body portion, 3ª, has on its outer face a hole, 4, countersunk, as at 5, and adapted to receive the correspondingly shaped end, 6, of a sleeve, 7, within which is a coiled spring, 8, said sleeve, 7, having two oppositely disposed slots, or openings, 9, 9, for a purpose hereinafter referred to again. A cylindrical member, 10, slotted on opposite sides and throughout a considerable portion of its length, as at 11, 11, has a reduced extension, 12, in the outer end of which is seated the rounded head of a screw, 13, said screw head being held against turning by means of a pin, 14, which seats in an indent or recess in top of said head and which allows said screw head to move slightly in its seat for alinement adjustment. The slots, 11, 11, at their inner ends are turned in opposite directions circumferentially of said member, as illustrated at 11', 11', for a purpose hereinafter referred to. When said member, 10, said extension, 12, and the screw, 13, are inserted through said coiled spring, 8, and said sleeve, 7, said screw extends through the body members, 3ª and 3ᵇ of the member 3, and receives the hand nut, 14, which has a threaded boss, 14', the end of which seats in a corresponding seat, 15, in the outer face of said member, 3ᵇ, whereby as said hand nut, 14, is screwed on to said screw, 13, said members, 10, 12 and 13 are pulled into said sleeve, 7, as indicated in Fig. 1.

A tubular member, 16, has an electric light cord, 17, therethrough, with an electric lamp, 18, on the end thereof, said tubular member being bent into a hook, 16', at its upper end so that when said member is removed from the sleeve, 7, and the member, 10, it can be hung over any other suitable support. It will be noted that said member, 16, is inserted laterally into the slots, 11, 11, in said member, 10, and in the slots, 9, 9, in the opposite sides of the end of the sleeve, 7, before said member 10, is turned slightly to move the bent portions, 11', of said slots, 11, 11, over said rod or tube, 16, whereupon said member 16, is locked in place and cannot be removed without loosening the hand screw, 14. As said hand screw, 14, is released, the spring, 8, normally moves said member, 10, outwardly out of said sleeve, 7. When it is loosened slightly, said members can be adjusted, or turned to different positions, as may be desired, and said member, 10, can be turned by hand, to turn the slots 11, 11, into register with the slots, 9, 9, in the sleeve, 7, whereupon said lamp tube, 16, can be removed laterally and disconnected entirely from said bracket. By providing the countersunk seat, 5, for the end of the sleeve member 7, said sleeve is firmly and adjustably held in place and at the same time, as said hand screw, 14, is tightened, the body members, 3ᵃ and 3ᵇ, are tightened upon the supporting rod, 1, and the lamp tube, 16, is clamped firmly within the sleeve, 7, by the ends of the slots at 11', all as clearly illustrated on the drawings.

While I have described in detail and illustrated one practical embodiment of my invention, I am aware that changes can be made therein without departing from the spirit thereof, and I do not limit the invention to the showing other than by the claims herewith.

I claim:

1. An adjustable bracket including a rod, a split member adjustably mounted thereon, a sleeve having an interfitting connection at its end with one side of said split member, a holding member telescoping through said sleeve and said split member, a spring in said sleeve operating to normally force said holding member outwardly, said holding member being slotted along its opposite sides and said sleeve being slotted in its end, and a hand nut and screw means for drawing said members together in clamping relationship, said holding member and said sleeve being adapted to hold another member in said slots.

2. In a device of the character referred to, in combination, a sleeve slotted from one end inwardly on opposite sides, means for supporting the same, a member telescoping into said sleeve and having a slot therein from one end for a part of its length, said slot at opposite sides of said member and at the inner end thereof turning in opposite directions circumferentially of said member, means at the other end of said sleeve and extending through said supporting means for pulling said member into said sleeve, and a member inserted sidewise into the open ends of said slots in said sleeve and telescoping member, said telescoping member clamping said latter member in place at the outer end of said sleeve.

3. In combination, a sleeve slotted from one end inwardly on opposite sides, a tubular member telescoping through said sleeve, said tubular member having a slot longitudinally thereof for a part of its length from its outer end, the inner end of said slot being offset to form in effect an opening transversely through said member opening into the slot at opposite sides thereof, a member transversely through said sleeve and adapted to rest through the opening at the inner end of the slot and to rest in said offset opening, whereby when said sleeve is turned said member can be removed laterally through said slot, means at the other end of said sleeve, attached to said telescoping member, for drawing said telescoping member into said sleeve for securing said member which extends through said sleeve transversely in clamped position.

4. In an adjustable bracket, a support, a clamping member adjustable on said support, a sleeve interfitting at one end with the side of said clamping member, a slotted member telescoping through said sleeve, a screw secured at one end to said slotted member within said sleeve and extending through said clamping member, a hand nut on said screw for drawing said slotted member into said sleeve and for clamping said clamping member on said support, and a spring in said sleeve operating normally to force said slotted member outwardly as said hand nut is released, said slotted member being adapted to adjustably hold a tubular like member inserted therein transversely.

5. In a device of the character referred to, two telescoping tubular members having their outer ends slotted from their ends inwardly on opposite sides, said slots being in register with each other, the slot in the inner member turning in opposite directions at their inner ends, means for drawing the inner member inwardly, means supporting said members with their slotted ends free to receive transversely a member to be held, and a member inserted sidewise into said slots and into the turned inner ends of the slots in said inner telescoping member, whereby said member inserted sidewise is clamped between the edges of the slots of said telescoping members.

6. In a device of the character shown, a supporting member, a sleeve having one end seated in the side of said supporting member and having its opposite end slotted on opposite sides from its end inwardly to provide two opposed open slots, a telescoping member telescoping with said sleeve and having its outer end slotted from the end inwardly, said slot turning to an angle at the inner end, said slot being adapted to register with the slot in said sleeve, whereby a member can be moved sidewise into said open slots in said members, means for turning said inner member to turn the angular part of said slot around said member when inserted sidewise therein, means on the opposite side of said supporting member and connected therethrough and through said sleeve for drawing said inner member into said sleeve and holding it, a spring in said sleeve normally and yieldingly pressing said inner member outwardly, whereby when released said inner member moves outwardly from said sleeve, and a member to be held inserted sidewise into said slots, substantially as described.

Signed at Pasadena, Los Angeles County, California, this 8th day of July, 1926.

GEORGE A. McDONALD.